(12) United States Patent
Jean

(10) Patent No.: US 7,648,139 B1
(45) Date of Patent: Jan. 19, 2010

(54) WORD ASSOCIATION GAME

(76) Inventor: Viveen R. Jean, 12567 Tangerine Rd., West Palm Beach, FL (US) 33412

( * ) Notice: Subject to any disclaimer, the term of this patent is extended or adjusted under 35 U.S.C. 154(b) by 265 days.

(21) Appl. No.: 11/692,044

(22) Filed: Mar. 27, 2007

(51) Int. Cl.
*A63F 3/06* (2006.01)

(52) U.S. Cl. .................... 273/272; 273/141 R

(58) Field of Classification Search ........... 273/272, 273/243, 141 R, 299
See application file for complete search history.

(56) References Cited

U.S. PATENT DOCUMENTS

| | | | |
|---|---|---|---|
| 1,545,085 A * | 7/1925 | Davidheiser | 273/141 R |
| 1,555,125 A * | 9/1925 | Lange | 273/272 |
| 2,380,106 A * | 7/1945 | Hilton | 273/240 |
| 4,123,051 A | 10/1978 | Tsacoyannis | |
| 4,222,561 A | 9/1980 | Whitten | |
| D259,796 S | 7/1981 | Meyer | |
| 4,592,553 A * | 6/1986 | Mammen et al. | 273/240 |
| 4,690,409 A * | 9/1987 | Scalia | 273/299 |
| 4,852,885 A * | 8/1989 | Baratpour et al. | 273/237 |
| 4,928,976 A | 5/1990 | Vano et al. | |
| 5,449,179 A * | 9/1995 | Hefferan | 273/269 |

\* cited by examiner

*Primary Examiner*—William M Pierce
(74) *Attorney, Agent, or Firm*—Crossley Patent Law; Mark Crossley

(57) ABSTRACT

A word association game played with a game-score card, a spinner wheel for selecting a letter to begin a word related to a topic category, adhesive labels, and at least one pencil in which players contrive words starting with a randomly selected letter, such words being associated with various categories agreed upon by the players, in which scoring is based upon originality of words contrived by the players for a topic category, and the time in which to complete each round of game play is determined by how quickly one of the players is able to complete each category with a word to stop the game play is disclosed. The present game promotes vocabulary skill development and creativity and awards originality.

1 Claim, 4 Drawing Sheets

WORD ASSOCIATION GAME

BACKGROUND OF THE INVENTION

Various types of games are known in the prior art. Prior art patents disclose games designed to entertain and encourage social interaction, while also providing education.

For instance, U.S. Pat. No. 4,928,976 issued to Vano et al. on May 29, 1990 teaches a word association game for two or more players, such game being played with a game score sheet, a timer, a spinner, a category card deck and a play word deck. The players spin the spinner and the one with the highest score is the starter. That person selects a play word from a list which is provided with the game. The word is then revealed to all players who write it across the top of their game score sheet. Each player then spins the spinner to determine which category they are to select a card from and that category is listed in various squares along the side of the score sheet. The players then fill in words associated with that category and beginning with each letter of the play word in the square over the top of the score sheet. The timer is set for some predetermined period during which the players must try to fill in all the squares under the letters. When the timer signals that time has expired, the players are scored for their responses, and the one with the highest score wins.

U.S. Pat. No. 4,222,561 issued to Whitten on Sep. 16, 1980 teaches a game device whereby a predetermined set of word category cards are selected randomly one at a time together with spinning a roulette wheel to select the first letter designation for a word response by the players which satisfies both the category and first letter so selected.

U.S. Pat. No. 4,852,885 issued to Baratpour et al. on Jan. 8, 1989 provides a fast action game which includes a wheel imprinted with the letters of the alphabet and numbers. The wheel is rapidly rotated by a motor in response to player actuation of a switch. When the switch is released, the wheel will coast to a stop with an indicator pointing to one of the letters or numbers on the wheel. Players then complete a scoresheet printed with various categories of items with a word beginning with the letter indicated by the wheel. If the wheel indicates a number pre-selected by one player, the player receives a bonus score. Play continues until all categories are completed by one player. A scoring system enables the determination of the finish rank of the other players.

U.S. Pat. No. 4,123,051 issued to Tsacoyannis et al. on Oct. 31, 1978 provides an educational game including a plurality of category cards each defining a category of items, a plurality of reference cards which list alphabetically items to be found in each category on the category cards, a plurality of score cards, a plurality of markers each having a letter of the alphabet thereon and a timer. One of the markers is selected along with one of the category cards. The players are then permitted to write down all the items they can think of in the category on their score cards within a pre-selected interval of time. The items in the selected category are written in alphabetical order beginning with the letter appearing on the selected marker.

U.S. Pat. No. 2,380,106 issued to Hilton on Jul. 10, 1945 teaches a game comprising the combination of a card having a plurality of vertical columns with headings therein fro designating the meaning of the words to be written in said columns and horizontal lines crossing said columns for writing words thereon in said columns, and an alphabet pool comprising men with letters of the alphabet thereon for determining the first letter of each of said words on said lines in said columns, as well as a game comprising the combination of a card having a plurality of vertical columns and horizontal lines crossing said columns for writing words thereon in said columns, said vertical columns having associated indicia for designating the class of words to be written therein, an alphabet pool comprising men with letters of the alphabet thereon for determining the first letter of each of said words on said lines in said columns, and a time pool having men with numerals thereon for determining the amount of time for each game.

U.S. Pat. No. D259,796 issued to Meyer on Jul. 7, 1981 illustrates an ornamental design for a game spinner.

FIELD OF THE INVENTION

The present invention relates to games, and more particularly, to a word association game and method for playing the game in which players contrive words associated with various categories agreed upon by the players, in which scoring is based upon originality of words contrived by the players, and the time in which to complete each round of game play is determined by how quickly one of the players is able to complete each category with a word to stop the game play.

SUMMARY OF THE INVENTION

In view of the aforestated known types of word association games now present in the prior art, the general purpose of the present word association game, described subsequently in greater detail, is to provide a word association game which has many novel features that result in a word association game which is not anticipated, rendered obvious, suggested, or even implied by prior art, either alone or in combination thereof.

To accomplish this, the present word association game, the present new and improved word association game provides players with fast-paced entertainment, while simultaneously promoting vocabulary skill development. The present game further encourages social interaction with other players. The game consists of a spinner wheel, a plurality of game-score cards, a plurality of adhesive labels, and at least one pencil. The spinner wheel has a pointer and the spinner wheel is imprinted with a blank circular space surrounding the pointer attachment means and with pie-shaped spaces, each of which is imprinted with a non-identical letter of the alphabet. The game-score cards have columns for each category and a last column on which scores are tallied. Categories relating to various topics, such as Name, Place, Food, Animal, and Occupation are imprinted on the game-score cards. Players are able to change categories by using the adhesive labels which are imprinted with a variety of categories. Adhesive labels, for example, may be imprinted with the word "ANIMAL", "FOOD", "SPORT", or other words. Prior to game play, players concur on the categories for play. The players either write the categories in the columns on their score sheets or use category labels and stick them onto the category columns. Players decide before game play begins as to whether to accept incomplete words for purposes of scoring points. For each round of game play, a player spins the spinner wheel such that the pointer lands on a space having a letter. If a player spins a previously used letter, the player spins again until the pointer lands on an unused letter. Each player writes down a word beginning with the letter for each category. When one player has completely filled in each category, he shouts "STOP!" and all players must stop writing. Players may also agree to stop play at a point during a round in which all or most of the players are encountering difficulty in finding a word beginning with a particular letter for a category. Upon stopping play and ending a round, players compare their answers. A player receives 20 points for an original or non-shared answer, 10 points for an answer shared with one other player, 5 points for an answer shared with two or more players. If a player continues to write subsequent to an announcement to stop writing, no points will be given for each answer written subsequent to such announcement. Players write down their scores and then a new round begins. Players must record their scores accurately and all answers must be verifiable. The first player to reach a predetermined score wins the game. The present word association game is provided for various themes, for example, boating, gardening, fishing, bartending, or the medical field. In yet another embodiment, the present game is provided in an academic version in which the topic categories are "NOUN", "VERB", "PRONOUN", "ADVERB" and "ADJECTIVE".

The instant word association game may be played an unlimited number of times by multiple players and players of a variety of ages. The present game is suitable for play by small to large groups. The lightweight and portable word association game can be easily transported to and played at almost any location. The limited number of parts simplifies storage of the present word association game. The word association game is compact for storage in limited space. The present word association game is made of typical materials known in the art.

An alternative embodiment may further comprise various themes for category cards, for example, boating, gardening, fishing, bartending, or the medical field An object of the present word association game is to promote development of vocabulary.

Another object of the present word association game is to provide players with fast-paced entertainment.

An additional object of the present word association game is to provide a versatile game which may be played by individuals with varied interests.

Yet another object of the present game is to encourage social interaction among players.

Still another object of the present word association game is to provide a game which may be played by small to large groups.

Even still another object of the present word association game is to provide a game which may be played by players of wide range of ages.

Even yet another object of the present game is to provide a word association game which may be played in a wide variety of settings.

It is yet a further object of the present word association game to provide a game, the rules for which are easy to learn.

It is yet even a further object of the present word association game to provide a game which is portable and compact for storage in small storage spaces.

Thus has been broadly outlined the more important features of the present word association game apparatus and method so that the detailed description thereof that follows may be better understood and in order that the present contribution to the art may be better appreciated.

Numerous objects, features and advantages of the present word association game will be readily apparent to those of ordinary skill in the art upon reading the following detailed description of presently preferred, but nonetheless illustrative, examples of the present word association game apparatus and method when taken in conjunction with the accompanying drawings. In this respect, before explaining the current examples of the present word association game apparatus and method in detail, it is to be understood that the invention is not limited in its application to the details of construction and arrangements of the components set forth in the following description or illustration. The invention is capable of other examples and of being practiced and carried out in various ways. It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the word association game apparatus and method. It is therefore important that the claims be regarded as including such equivalent constructions insofar as they do not depart from the spirit and scope of the present invention.

Objects of the present word association game apparatus and method, along with various novel features that characterize the invention are particularly pointed out in the claims forming a part of this disclosure. For better understanding of the word association game apparatus and method, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
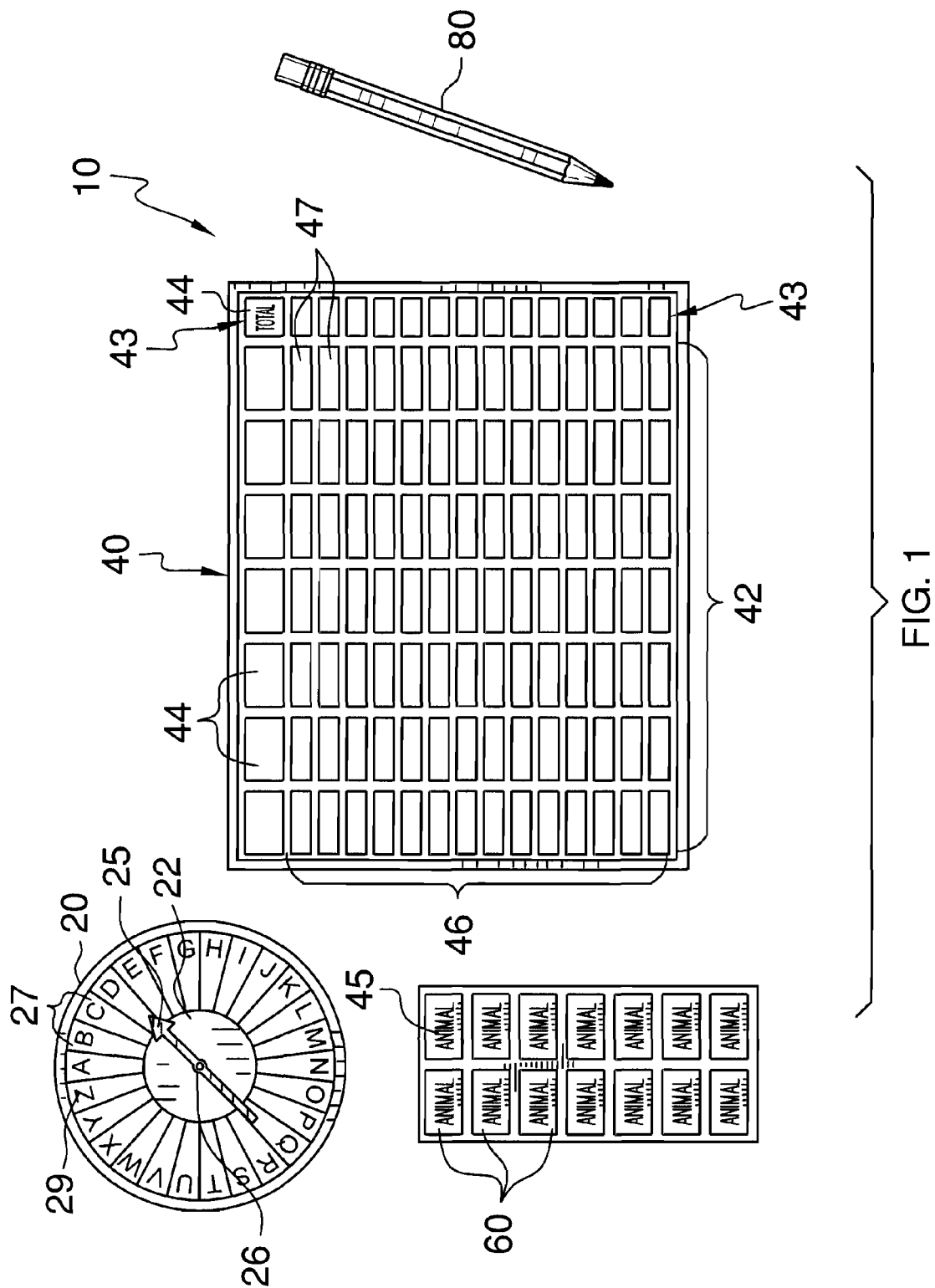
FIG. 1 is a top plan view of the components of the game.
Figure 2:
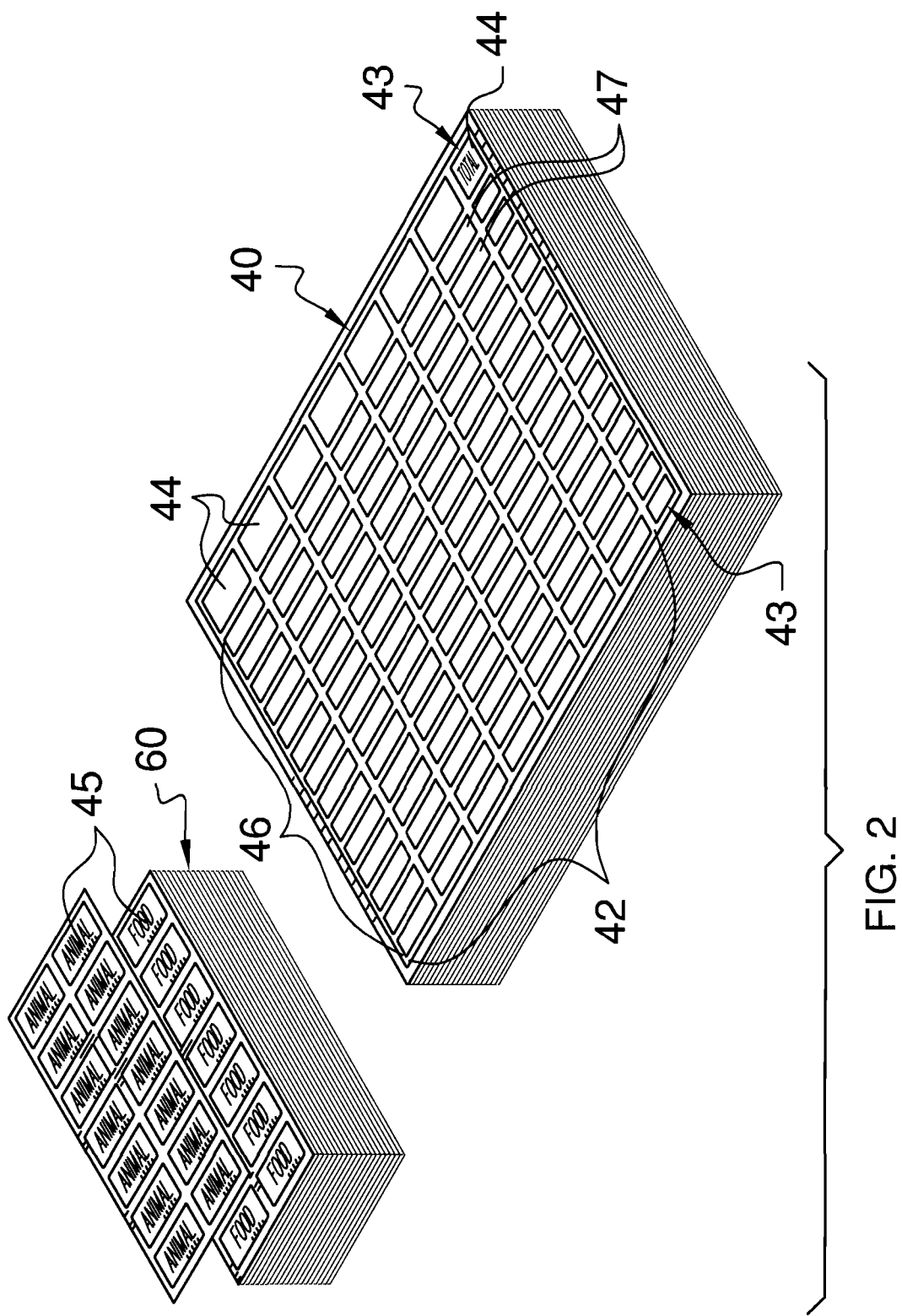
FIG. 2 is an isometric view of a labels and game-score cards.

With reference now to the drawings, and in particular FIGS. 1 through 4 thereof, example of the instant word association game employing the principles and concepts of the present word association game and generally designated by the reference number 10 will be described.

Referring to FIGS. 1 through 4, the present word association game 10 comprising a spinner wheel 20, a plurality of game-score cards 40, a plurality of adhesive labels 60, and at least one pencil 80 is disclosed. Said spinner wheel 20 is circular and comprises a pointer 25, an inner circle 22, and a plurality of pie-shaped spaces 27. Said pointer 25 is rotatably attached to the center of said spinner wheel 20 by an attachment means 26 which allows for the free rotation of said pointer 25 over the spinner wheel 20 in a manner well known to those skilled in the art. Said spinner wheel 20 is imprinted with a blank inner circle 22 surrounding said pointer 25 attachment means 26. Each of said spaces 27 is imprinted with a non-identical letter 29 of the alphabet, said letters 29 being located circumferentially around said said spinner wheel 20. Said game-score cards 40 have a plurality of columns 42, preferably seven, with headers 44 above each column and a plurality of rows 46 having blank write-in spaces 47 below each of said headers 44. Said write-in spaces 47 are for writing in answers in a plurality of topic categories 45. A total column 43, designated with the word "TOTAL" imprinted in the header 44 above such total column 43 and in which scores are tallied, is also provided on said game-score card 40. In one embodiment shown in FIGS. 1 and 2, categories 45 for game play are designated by writing in categories 45 on said game-score card 40 or by placing said adhesive labels 60, which are either imprinted with a category 45 or upon which are written a category 45, above said columns 42.

Figure 3:
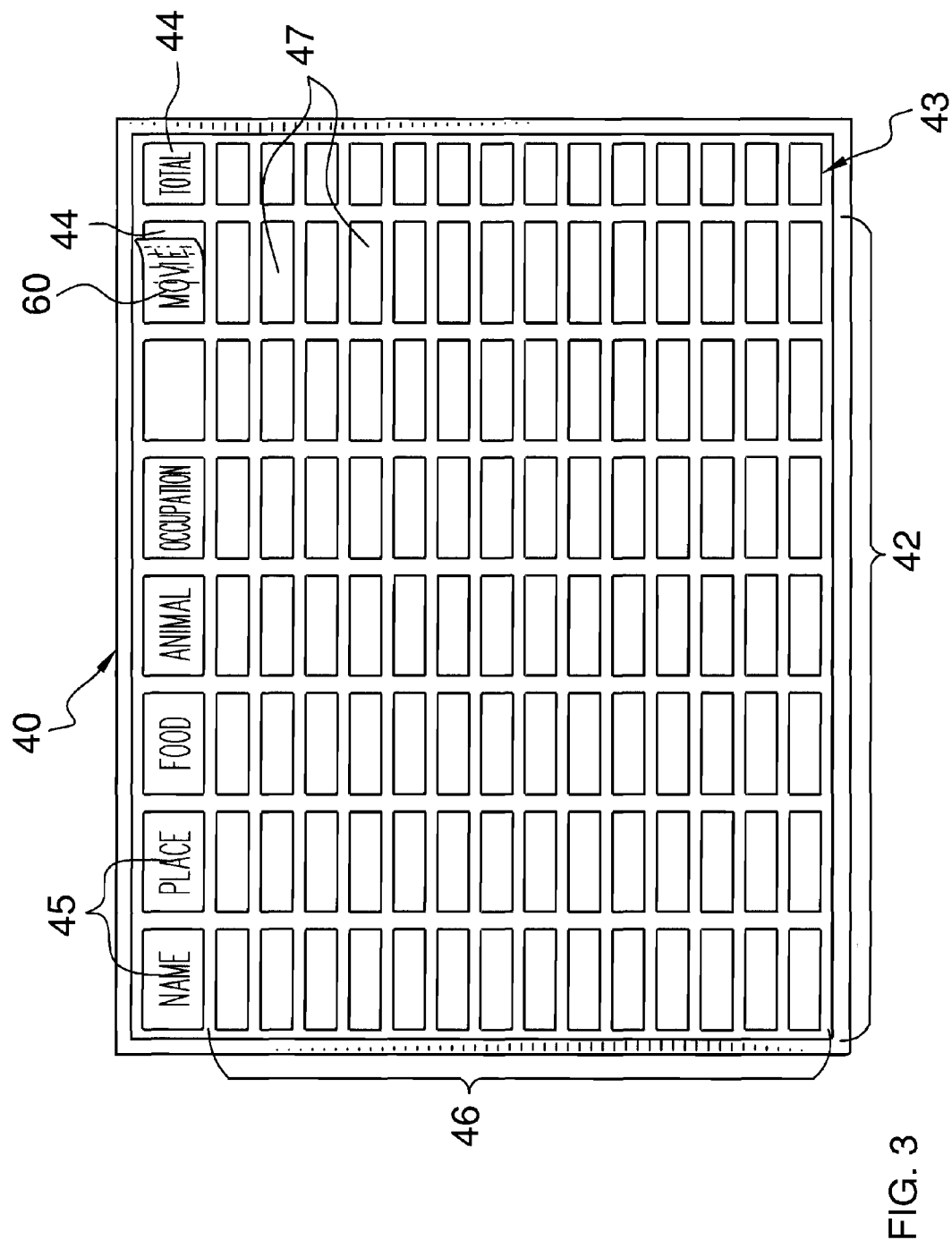
FIG. 3 is a top plan view of an alternative embodiment illustrating a game-score card having imprinted topic categories above columns and columns labeled with adhesive labels, such topic categories selected from the group consisting of "NAME", "PLACE", "FOOD", "ANIMAL", and "OCCUPATION".

In another embodiment shown in FIG. 3, categories 45 selected from the group consisting of Name", "Place", "Food", "Animal", and "Occupation" are imprinted in headers 44 above the first five columns 42 on said game-score cards 40. However, players are able to change categories 45 imprinted on said game-score cards 40 by placing said labels 60, which are blank or imprinted with a variety of names of topic categories 45, in headers 44 above said columns 42, over imprinted columns 42 as well as for unlabeled columns 42.

Figure 4:
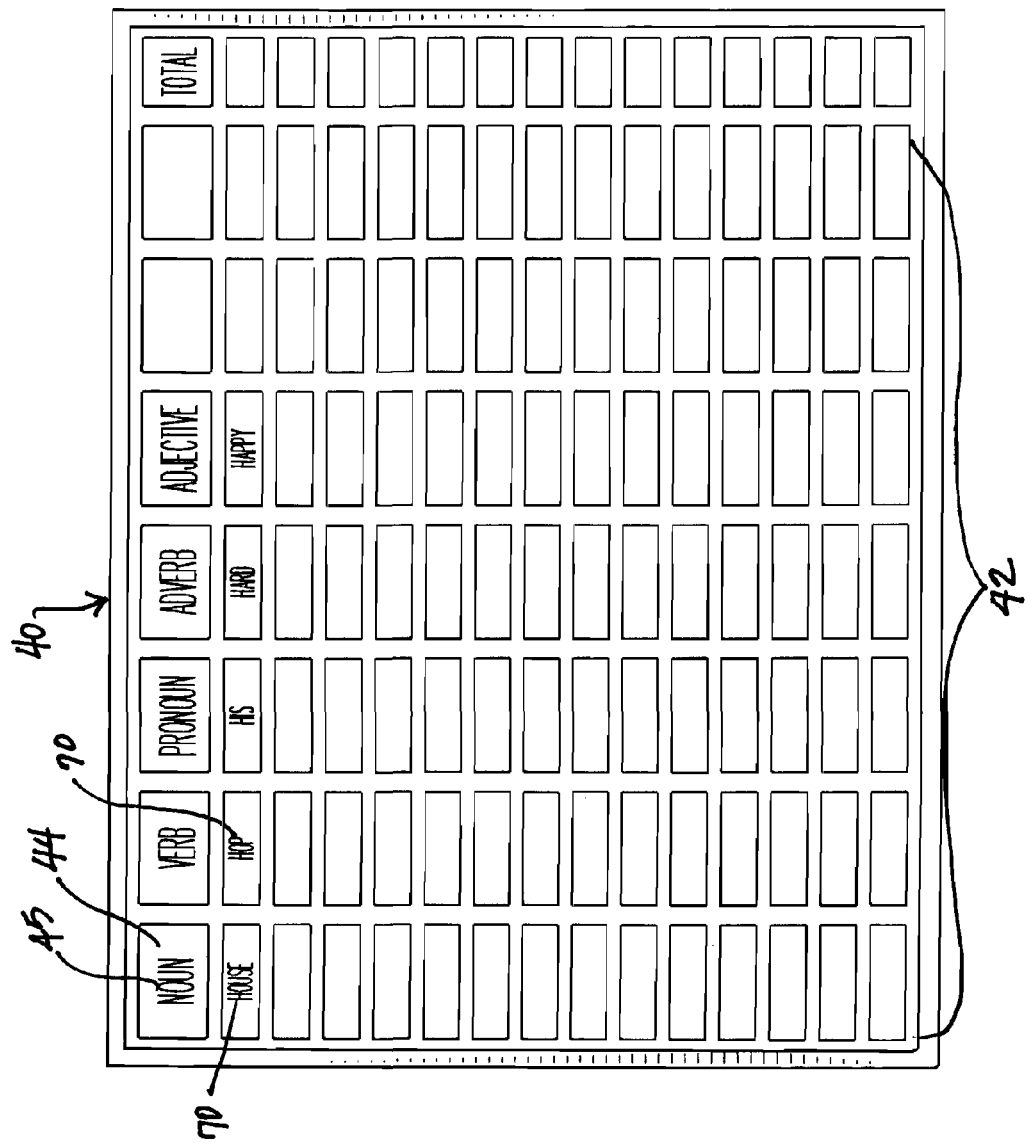
FIG. 4 is a top plan view of another alternative embodiment illustrating game-score card having imprinted topic categories selected from the group consisting of "NOUN", "VERB", "PRONOUN", "ADVERB", and "ADJECTIVE".

Yet another embodiment of the present word association game is illustrated in FIG. 4 in which categories 45 selected from the group consisting of "NOUN", "VERB", "PRONOUN", "ADVERB", and "ADJECTIVE" are imprinted in headers 44 above the first five columns 42 on said game-score cards. 40. FIG. 4 also illustrates examples of answers 70 in each category 45.

Use:

Prior to game play, players concur on the topic categories 45 for a round of game play. The players either write the topic categories 45 in the headers 44 above said columns 42 on their game-score cards or use category labels 60 and stick them in headers 44 above category columns 60. Additionally, players decide before game play begins as to whether to accept incomplete words for purposes of scoring points. For each round of game play, a player spins the spinner wheel 20 such that the pointer 25 lands on a space 27 imprinted with a letter 29. If the pointer lands on a previously used letter, the player spins again until the pointer lands on an unused letter. Each player writes down a word beginning with such letter 29 for each topic category 45. When one player has completely filled in each topic category 45, he shouts "STOP!" and all players must stop writing; provided, however, if all or most of the players are having extreme difficulty finding a word beginning with a particular letter 29 for a topic category 45 during a round of play, players may agree to stop a round of game play, tally their points, and begin another round. When each round ends, players compare their answers. A player receives 20 points for a unique or, in other words, non-shared answer, 10 points for an answer shared with one other player, 5 points for an answer shared with two or more players. If a player fails to stop writing subsequent to the shouting of "STOP" or after players have agreed to stop a round of game play, no points are awarded for each such answer. Players write down their scores on said game-score cards 40 in said total column 43 and then a new round begins. Players must record their scores accurately in said total column 43 and all answers must be verifiable. The first player to reach a predetermined score wins the game.

The instant word association game 10 may be played an unlimited number of times by multiple players and players of a variety of ages. The present game 10 is suitable for play by small to large groups of players. The lightweight and portable word association game 10 can be easily transported to and played at almost any location. The limited number of parts simplifies storage of the present word association game 10. The word association game 10 is compact for storage in limited space. The present word association game 10 is made of typical materials known in the art.

With respect to the above description then, it is to be realized that the optimum dimensional relationships for the parts of the present word association game to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of playing a word association game consisting of:
   providing a plurality of game-score cards consisting of:
      a plurality of first columns;
      an imprinted header disposed above each first column;
      a pair of second columns;
      a pair of blank second headers disposed above each second column;
      a third column;
      a third header imprinted with the word "TOTAL" disposed above the third column;
   determining topic categories for a round of game play upon concurrence of players;
   using the topic categories imprinted on headers above the first columns;
   selectively changing topic categories in the second headers by utilizing a method selected from the group consisting of writing in topic categories into the second headers, placing a label imprinted with a topic category into each of the second headers, and placing a label upon which is written a topic category into each of the second headers;
   determining prior to game play whether incomplete words provided as answers will be accepted for purposes of scoring points;
   beginning a round of game play by a player spinning a spinner wheel such that a pointer on the spinner wheel lands on a space imprinted with a letter on said spinner wheel;
   writing down a word beginning with the letter for each of the topic categories;
   spinning again until the pointer lands on letter upon which the pointer has not landed during a round of game play;
   writing down a word beginning with such letter for each topic category;
   shouting the word "STOP!" by a player, when a player has written down a word for each topic category, the shouting of the word "STOP" requiring each and every player to stop writing answers;
   stopping a round of game play when players agree to stop a round, the stopping of game play requiring each and every player to stop writing answers;
   comparing all players' answers;
   scoring answers selected from the group consisting of 20 points for each unique, non-shared answer, 10 points for an answer shared with only one other player, 5 points for answer shared with two or more other players; 0 points for answers written down by a player after another player has shouted the word "STOP!" or after players have agreed to stop a round of game play;

writing the scores in the total column for each round; and declaring a player as winner of the game play upon such player's score for rounds during game play reaching a predetermined winning score level.

\* \* \* \* \*